United States Patent [19]
Rotterman

[11] 3,933,237
[45] Jan. 20, 1976

[54] CONVEYOR FOR A TRANSIT WAREHOUSE FOR PARCELLED CARGO TO BE STORED, PARTICULARLY FOR GOODS TRANSPORTED ON PALLETS

[76] Inventor: Robert Rotterman, Rebbergstrasse 81 d, CH-8102 Oberengstringen, Switzerland

[22] Filed: Aug. 28, 1974

[21] Appl. No.: 501,028

[30] Foreign Application Priority Data
Aug. 30, 1973  Switzerland.................. 12418/73

[52] U.S. Cl. ............... 198/37; 198/76; 198/102
[51] Int. Cl.² ............................................. B65G 37/00
[58] Field of Search ....... 198/76, 102, 82, 110, 203, 198/127 R, 37, 38, 34

[56] References Cited
UNITED STATES PATENTS

| | | | |
|---|---|---|---|
| 2,701,049 | 2/1955 | Kendall et al. | 198/110 X |
| 3,075,630 | 1/1963 | Fisk | 198/76 |
| 3,127,003 | 3/1964 | Goepper et al. | 198/127 R |
| 3,254,778 | 6/1966 | Marland et al. | 198/110 X |
| 3,706,370 | 12/1972 | Bonafino et al. | 198/203 |

FOREIGN PATENTS OR APPLICATIONS

| | | | |
|---|---|---|---|
| 1,033,281 | 6/1966 | United Kingdom | 198/37 |

Primary Examiner—Robert J. Spar
Assistant Examiner—James M. Slattery

[57] ABSTRACT

A conveyor path comprising three conveyors, namely, a first conveyor disposed at the delivery point, a second conveyor disposed on the build-up stretch, and a third conveyor disposed at the outlet or pick-up point; and further comprising a driving mechanism which enables the second conveyor to be driven independently of the two other conveyors in backward direction, or in conjunction with one of the other conveyors, or both of them, in forward direction; the driving mechanism controlled by a switching arrangement actuated by the passing goods so that, during delivery, the goods accumulate or "build-up" at the beginning of the build-up stretch and, during the release of goods, the goods accumulate at the end of the build-up stretch. In the case of alternating delivery-release operation with an incompletely occupied build-up section, all the goods accumulated at the end of the build-up stretch are shifted to the beginning of the build-up stretch when the delivery station is occupied, whereas the goods present in the above configuration are shifted to the end of the build-up stretch when the pick-up station has been cleared of goods.

6 Claims, 4 Drawing Figures

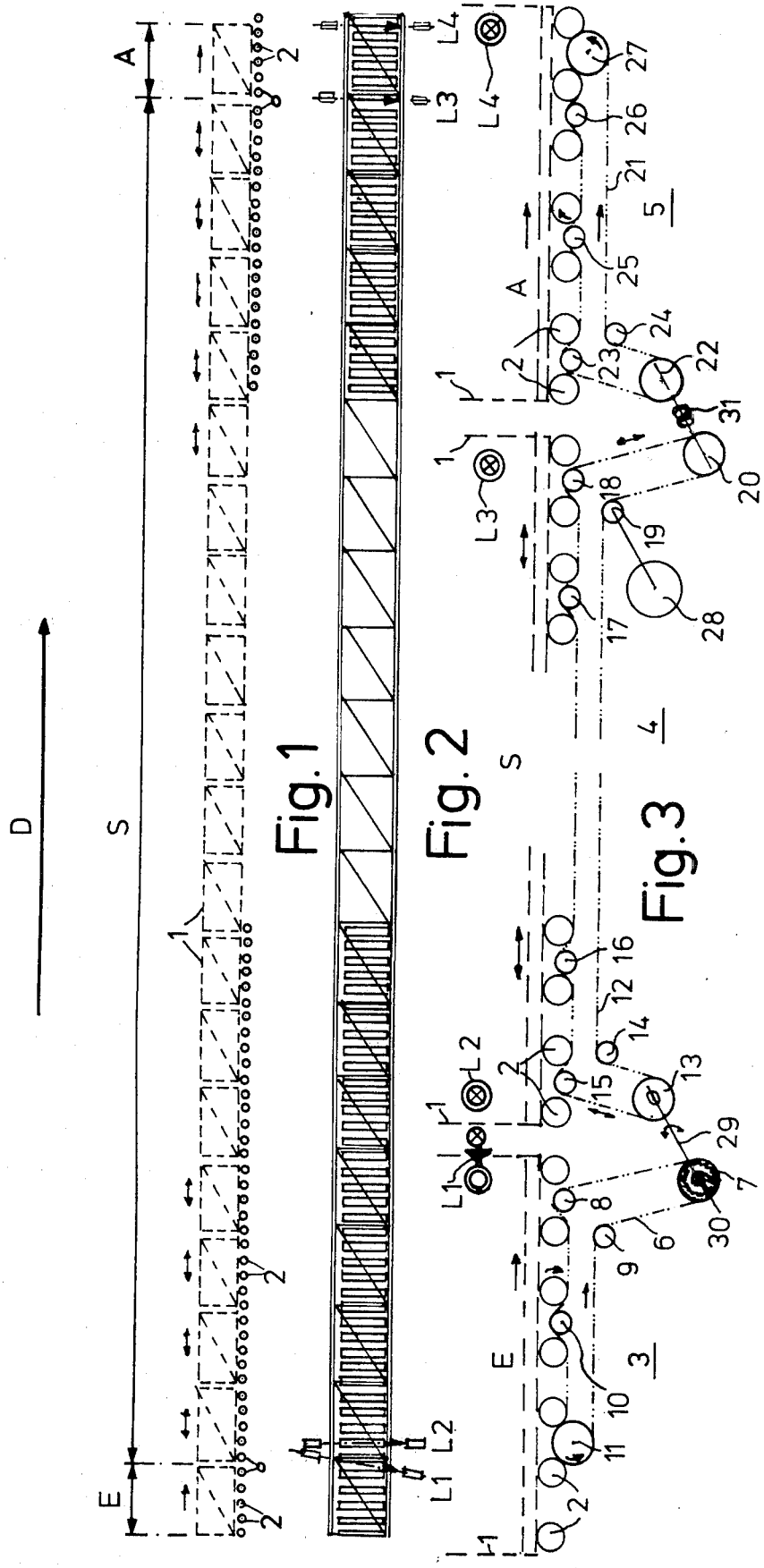

CONVEYOR FOR A TRANSIT WAREHOUSE FOR PARCELLED CARGO TO BE STORED, PARTICULARLY FOR GOODS TRANSPORTED ON PALLETS

BACKGROUND OF THE INVENTION

1. Field of the Invention

The present invention relates to a conveyor apparatus for a transit-type warehouse or transit store for parcelled goods and, more particularly, for cargo to be stored on pallets. The conveyor apparatus of the invention comprises at least one conveyor line with a delivery station, a build-up stretch including a plurality of storage points to be passed in succession by the goods, and a pick-up station.

2. Description of the Prior Art

A matter of the prior art are transit warehouses for goods on pallets, wherein individually driven conveyor means are provided for each storage point on the build-up stretch. The driving motors of the conveyors are controlled by switching means actuated by the passing goods in the manner of the well-known section blocking of railroad engineering. Apparatus of this type is expensive due to the large number of driving motors and switching devices required.

Apart from this apparatus, transit storage deposits with an inclined path used as an accumulation section for goods on pallets are a matter of the prior art. The disadvantage of apparatus of this type results from the excessively high head pressure which is exerted by the goods in the case of a long build-up stretch. Apparatus comprising an inclined stretch can be used in continuous operation without jamming only when the pallets used for the goods are in excellent condition. Jamming can occur in the passage of the pallets, when the state of successive pallets in a row varies (e.g., perfect and damaged pallets, wet and dry pallets).

SUMMARY OF THE INVENTION

The goal of the present invention is to create a conveyor apparatus for a transit warehouse which is free of the above disadvantages and works with a smaller number of conveyor means and, hence, of driving motors and switching means than the transit deposits of the above-specified type, while, at the same time, the reliability of operation is increased relative to transit warehouse comprising an inclined stretch.

The conveyor apparatus of the present invention is characterized by a conveyor path comprising three conveyors, namely, a first conveyor disposed at the delivery point, a second conveyor disposed on the build-up stretch, and a third conveyor disposed at the outlet or pick-up point; by driving means which enable the second conveyor to be driven independently of the two other conveyors in backward direction, or in conjunction with one of the other conveyors, or both of them, in forward direction; and by driving means controlled by switching means actuated by the passing goods so that, during delivery, the goods accumulate or "build-up" at the beginning of the build-up stretch and, during the release of goods, the goods accumulate at the end of the build-up stretch. In the case of alternating delivery-release operation with an incompletely occupied build-up section, all the goods accumulated at the end of the build-up stretch are shifted to the beginning of the build-up stretch when the delivery station is occupied, whereas the goods present in the above configuration are shifted to the end of the build-up stretch when the pick-up station has been cleared of goods.

The three conveyors can be operated by a single driving motor which is directly coupled to the second conveyor and which drives the first and third conveyors through separate clutch couplings. An overrunning clutch can be inserted into the driving coupling to the first conveyor. The cost of the driving means can be minimized in this fashion.

In the case of alternating delivery-release operation with an incompletely occupied build-up stretch, the goods to be stored are shifted back and forth from the end of the build-up stretch to its beginning, in order to obtain a continuous row of goods to be stored near the end of the build-up stretch.

This mode of operation of the transit warehouse of the invention can be obtained with only four control devices for controlling the driving means. One switching unit is disposed at the end of the first conveyor; another, at each the beginning and the end of the second conveyor; and still another at the end of the third conveyor.

BRIEF DESCRIPTION OF THE DRAWINGS

The drawings show an exemplary embodiment of the invention in schematic form.

FIGS. 1 and 2 are an elevation view and a top view of a conveyor apparatus of the invention for goods on pallets.

FIG. 3 shows the corresponding driving means plotted to an enlarged scale.

DESCRIPTION OF THE PREFERRED EMBODIMENTS

Figure 4:
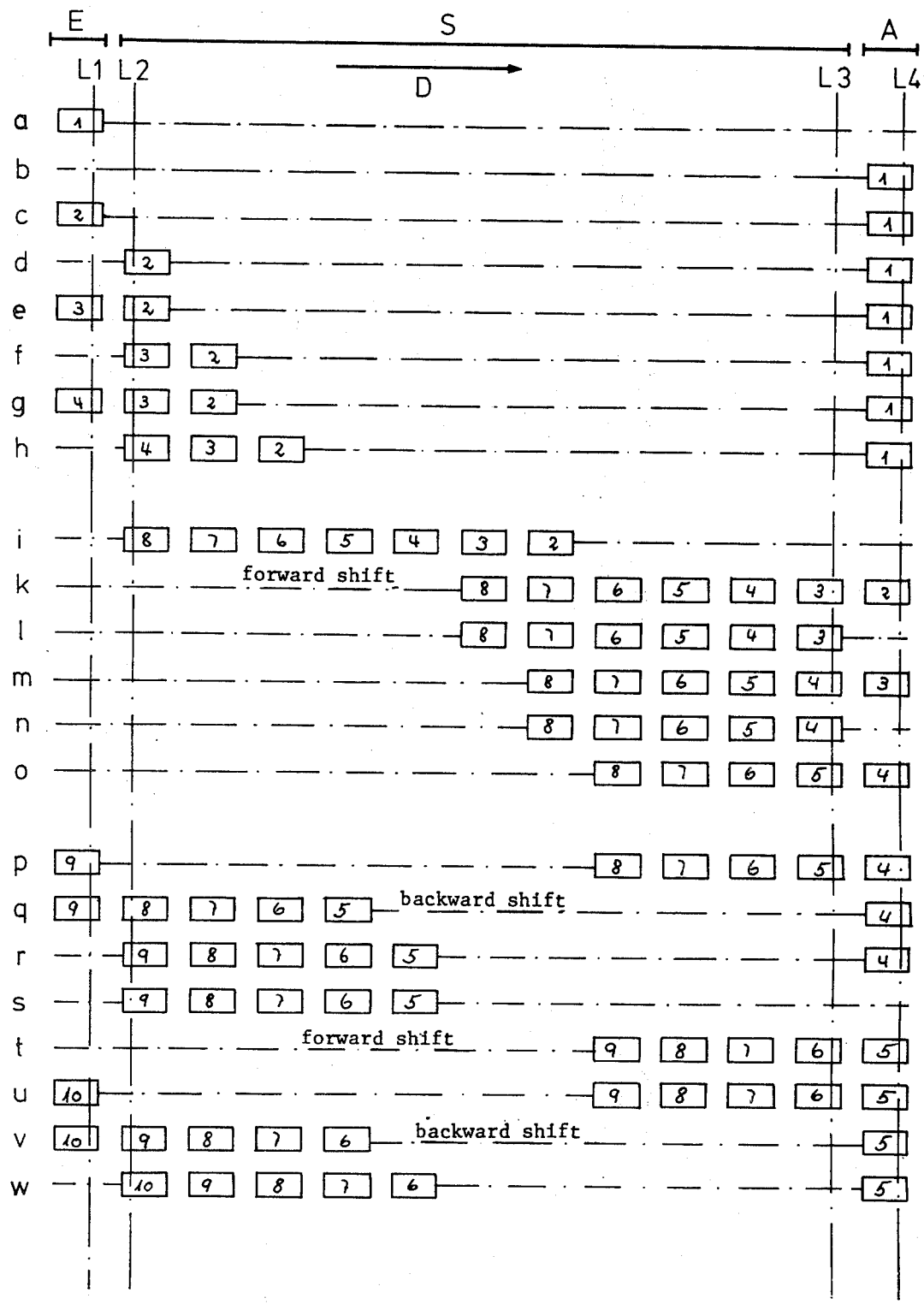
FIG. 4 is a diagram of the various steps of operation.

Usually several conveyors arranged in side-by-side relationship are provided for individual storage of certain goods of an assortment in a transit warehouse. Only one conveyor path is shown in the figures. The conveyor path consists of the delivery station E; a build-up stretch S with a plurality of storage points through which the goods pass in succession; and a pick-up station A. Room for one pallet is provided at both the delivery station E and the pickup station A. In the case of an extremely long build-up stretch, it may be convenient to provide space for more than one pallet at stations E and A. The storage points along the conveyor path are indicated by goods 1 outlined with broken lines. Arrow D denotes the direction in which the goods pass through the warehouse. The conveyor path consists of three separate conveyors which, in the embodiment described, are roller conveyors with rollers 2. First conveyor 3 (FIG. 3) extends into the delivery station E, second conveyor 4 extends along build-up stretch S, and third conveyor 5 extends into pick-up station A.

Rollers 2 of each conveyor 3, 4, 5 are operated by a chain drive which comprises a chain 6 and chain-guiding sprockets 13 through 20 in second conveyor 4; and chain 21 and chain-guiding sprockets and chain-guiding sprockets 22 through 27 in third conveyor 5. An electric motor 28 is used to drive the three conveyors 3, 4, 5. Electric motor 28 is directly coupled to second conveyor 4 via a sprocket 19. Sprocket 13 of second conveyor 4 and sprocket 7 of first conveyor 3 are mounted on a common shaft 29, with sprocket 13 fixedly attached to shaft 29 and sprocket 7 mounted on shaft 29 via an overrunning clutch 30. Third conveyor 5 can be engaged by second conveyor 4 to be driven by means of a clutch coupling 31 capable of making the shafts of sprockets 20 and 22 to engage.

The driving means are controlled through control means in the form of light barriers L1, L2, L3, and L4 which are operated by the passing pallets. Light barrier L1 is situated at the end of first conveyor 3; light barrier L2, at the beginning of second conveyor 4; light barrier L3, at the end of second conveyor 4; and light barrier L4, at the end of third conveyor 5. Light barrier L1 at the end of first conveyor 3 crosses the conveyor path at a certain angle, which causes spacing of the pallets. Control means other than light barriers can be employed.

A control unit (not shown) employs the various switching states of the four light barriers L1, L2, L3, and L4 to form control signals for the driving means of the three conveyors 3, 4, and 5. The following table is a list of the possible control phases No. I through No. XV. The notation is interpreted as follows: O indicates that the light barrier is not actuated (uninterrupted light ray); 1 denotes that the light barrier is actuated, (light beam interrupted); the states of motion of the conveyors at delivery station E, along build-up stretch S, and at pick-up station A are indicated in the following manner: O denotes stop, V denotes forward motion, and R denotes backward motion of the conveyors.

| Nr. | L 1 | L 2 | Control phases L 3 | L 4 | E | S | A |
|---|---|---|---|---|---|---|---|
| I | 1 | 0 | 0 | 0 | V | V | V |
| II | 0 | 1 | 0 | 0 | V | V | V |
| III | 0 | 0 | 1 | 0 | V | V | V |
| IV | 0 | 1 | 1 | 0 | V | V | V |
| V | 1 | 1 | 0 | 0 | V | V | V |
| VI | 1 | 1 | 1 | 0 | V | V | V |
| VII | 1 | 0 | 0 | 1 | V | V | 0 |
| VIII | 1 | 1 | 0 | 1 | V | V | 0 |
| IX | 1 | 0 | 1 | 1 | 0 | R | 0 |
| X | 1 | 0 | 1 | 0 | 0 | R | 0 |
| XI | 0 | 0 | 0 | 1 | 0 | 0 | 0 |
| XII | 0 | 1 | 0 | 1 | 0 | 0 | 0 |
| XIII | 0 | 0 | 1 | 1 | 0 | 0 | 0 |
| XIV | 0 | 1 | 1 | 1 | 0 | 0 | 0 |
| XV | 1 | 1 | 1 | 1 | 0 | 0 | 0 |
| XVI | 0 | 0 | 0 | 0 | 0 | 0 | 0 |

It follows from the above table that the three conveyors move forward (control phases Nos. I through VI) whenever pick-up station A is unoccupied and there is at least one pallet at delivery station E or at either the beginning or end of build-up stretch S. Only the two conveyors at delivery station E and along build-up stretch S move forward (control phases Nos. VII and VIII), when delivery station E and pick-up station A are occupied and there is no pallet at the end of build-up stretch S. However, if under otherwise similar conditions, a pallet is present at the end of build-up stretch S without a pallet at the beginning of the build-up stretch (control phase No. IX), conveyor 4 is moved backward along build-up stretch S, while the other conveyors are idle. In the event that pick-up station A is occupied and delivery station E is unoccupied or that the entire conveyor path is completely covered with pallets or completely empty, the three conveyors are idle (control phases XI through XVI).

The diagram of FIG. 4 is used to explain the various steps of operation. Each of the lines denoted by a, b, c, ... u. v. w in the diagram of FIG. 4 represent the final position in a phase of operation. Accordingly, the pallets which are submitted for storage are denoted by numbers 1, 2, 3, . . . in the sequence of their arrival. The points at which the pallets intersect the light barriers L1, L2, L3, and L4 (denoted by vertical dashed lines) imply operation of the light barriers. Lines a through h denote the phases of the delivery operation; lines i through o denote the phases of the pick-up operation; and lines p through w denote the phases of intermittent delivery and pick-up operations.

When the conveyor path is initially empty and pallet No. 1 is transferred to delivery station E (a), the pallet is moved in a continuous motion to pick-up point A where the pallet comes to a stop (b). In this process, the control phases Nos. I, II, III, and XI occur. When pallet No. 2 (c) arrives at the delivery station and pallet No. 1 remains at the pick-up station, pallet No. 2 is not moved to the end of build-up stretch S to the empty storage position behind pallet No. 1 which is ready for removal. Pallet No. 2 rather progresses only by one storage position to the beginning of build-up stretch S (d), as provided by control phases Nos. VII and XII. As long as pallet No. 1 remains at the pick-up station A, additional pallets Nos. 3, 4, . . . (e or g) delivered move forward along with the pallets which are already on build-up stretch S in the form of a row. The pallets move forward by one storage position whenever a new pallet is introduced (f or h). This is effected by control phases Nos. VIII and XII. As soon as the stepwise progressing row of pallets has reached the end of build-up stretch S and has come to a stop behind pallet No. 1 which is still at the pick-up station (control phase No. XIV), it is possible to store still a last pallet without setting off an additional motion of the conveyor (control phase No. XV), because all storage positions of the conveyor path of the transit warehouse are fully occupied.

When pallet No. 1 is then removed from pick-up point A (i), the totality of pallets accumulated at the beginning of build-up stretch S (pallets Nos. 2 through 6 in the example shown in the drawing) are shifted to the end of build-up stretch S, as provided by control phases Nos. II, III, and XIII. In this process the foremost pallet No. 2 arrives at the pick-up station (k). When pallet No. 2 (l) is removed, the following pallets, which form a continuous row, proceed by one storage position so that pallet No. 3 is ready to go at pick-up station A (m). This is effected by control phases Nos. III and XIII. The same cycle of operations is repeated when the next pallet is released (n, o). Control phase No. XVI, which keeps the three conveyors stopped, occurs after the last pallet's removal from pick-up station A. Control phase No. IV is effective when all storage positions of build-up stretch S are occupied in the removal operation of a pallet; control phase No. VI is effective, when, in addition, delivery station E is busy. In both cases, the row of pallets simply proceeds by one storage position, with the foremost pallet arriving at the pick-up station, whereupon the conveyors are made inoperative as provided by control phases Nos. XIII and XIV, respectively.

In alternating delivery and pick-up operations with incompletely occupied build-up stretch S, the totality of pallets accumulated at the end of build-up stretch S are shifted to the beginning of build-up stretch S when the delivery station is full; similarly, when the pickup station is free, the totality of pallets on the build-up stretch are shifted to the end of build-up stretch S.

For example, when a row of pallets is situated at the end of the conveyor path with pallet No. 4 on pick-up station A and pallets Nos. 5 through 8 at the end of build-up stretch S and when then another pallet No. 9 is delivered (p), pallets Nos. 5 through 8 are brought back to the beginning of the build-up stretch S (q) in accordance with control phase IX; after that, control phases Nos. VIII and XII provide for a forward motion of all pallets Nos. 5 through 9 located at the beginning of the conveyor path, with the pellets moved forward by one storage position (r). Finally, if afterwards pallet No. 4 (s) is removed from the pick-up station A, the totality of remaining pallets Nos. 5 through 9 is shifted forward to the end of the conveyor path (t), with control phases Nos. II and XIII being effective. If another pallet (No. 10) is delivered for storage, the pallets on build-up stretch S are once more moved backward, whereupon all the pallets accumulated at the beginning of the conveyor path are moved forward (u, v, w).

In the event that a pallet is delivered when another pallet is picked up at the same time, first the totality of pallets on the incompletely covered build-up stretch S are moved backward to the beginning of the build-up stretch, unless the pallets are already in that position; after that, the totality of the pallets are moved to the end of the conveyor path (control phases Nos. V, II, III, XIII and Nos. X, V, II, III, XIII, respectively).

In order to guarantee the full series of operational phases described even in the case of a temporary interruption of the mains power, the control commands must be stored. Means appropriate for this purpose are known to those skilled in the art.

What I claim is:

1. Conveyor apparatus for parcelled goods, particularly for goods to be stored on pallets, with at least one conveyor path comprising a delivery station, a build-up stretch with a plurality of storage points to be passed in succession by the goods, and a pick-up station, comprising:

a first conveyor at the delivery station;
    a second conveyor along the build-up stretch;
    a third conveyor at the pick-up station said second conveyor having a beginning adjacent said first conveyor and an end adjacent said third conveyor;
    driving means for moving said second conveyor independently of said other two conveyors in backward direction or together with either one of said other conveyors or both of them in forward direction; and
    switching means for controlling said driving means and actuated by the passing goods so that, in a delivery mode, said goods are delivered by said first conveyor to accumulate at the beginning of said build-up stretch and, in a pick-up mode, said accumulated goods are moved to the end of said build-up stretch to be picked up by said third conveyor, and so that, in an alternating delivery and pick-up mode with an incompletely occupied build-up stretch, the totality of goods accumulated at the end of said build-up stretch are shifted backward to the beginning of said build-up stretch when said delivery station is served with goods awaiting to be delivered to said second conveyor, while said totality of goods are shifted to said end of said build-up stretch when said pick-up station is ready to pick up goods from said second conveyor, the shift to the beginning having priority so long as goods are awaiting delivery at said delivery station to an available storage point on said second conveyor.

2. Conveyor apparatus as defined in claim 1, characterized in that there is provided for said three conveyors a common driving motor which is directly coupled to said second conveyor and coupled to said first and said third conveyor by means of respective clutch couplings.

3. Conveyor apparatus as defined in claim 2, characterized in that an overrunning clutch is inserted in the driving coupling means to said first conveyor.

4. Conveyor apparatus as defined in claim 1, characterized in that said switching means comprises a first switching device disposed at the end of said first conveyor, second and third switching devices disposed at the beginning and at the end of said second conveyor, respectively, and a fourth switching device disposed at the end of said third conveyor.

5. Conveyor apparatus as defined in claim 1, characterized in that the motion of said second conveyor covered with said goods is stepwise during delivery operations of goods and removal of the same, and that said motion is continuous in alternating delivery and pick-up operations when the goods are shifted from the beginning to the end and from the end to the beginning of said build-up stretch.

6. Conveyor apparatus as defined in claim 1, characterized in that at said delivery station and/or at said pick-up station there is provided more than one storage position and that said first and said third conveyor are subdivided to form a plurality of individually controlled conveyors corresponding to the number of said storage positions.

* * * * *